June 14, 1932.  R. E. CHOATE  1,862,784
TRACKLAYING BELT
Filed Sept. 14, 1931  5 Sheets-Sheet 1

Inventor
R. E. CHOATE
By
Attorney

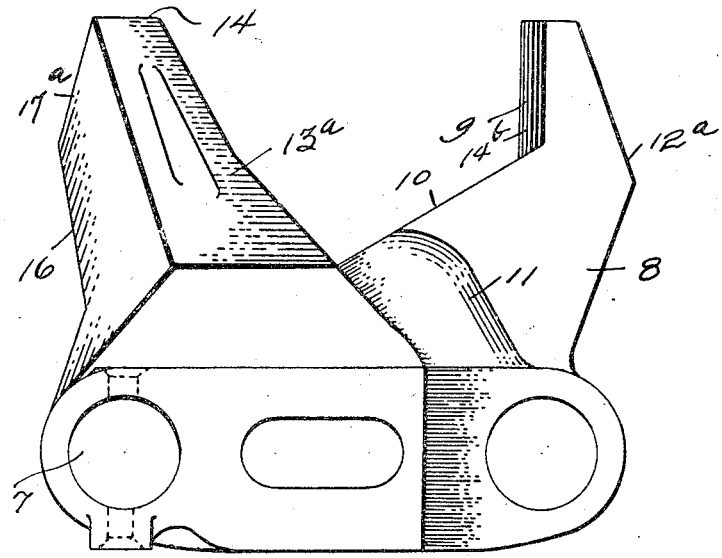
FIG-3-
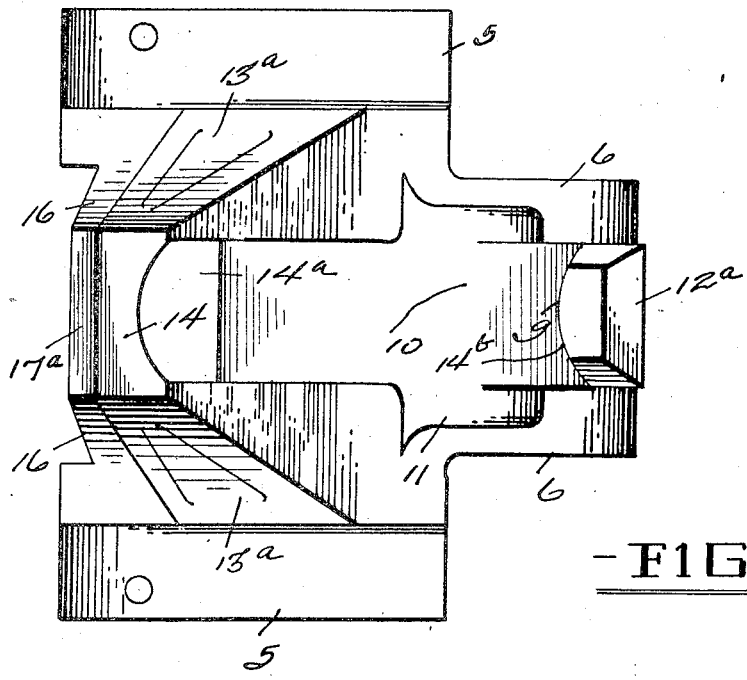
FIG-4-
Inventor
R. E. CHOATE,
By
Attorney

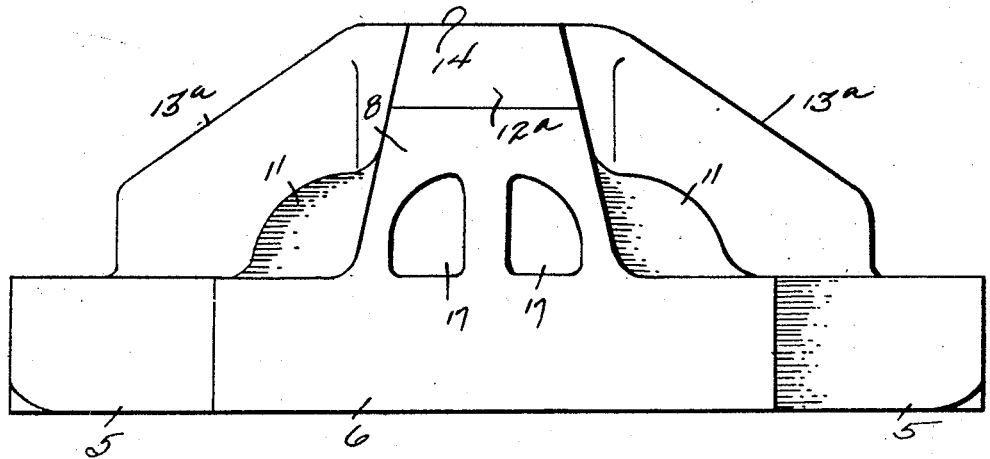
FIG-5-
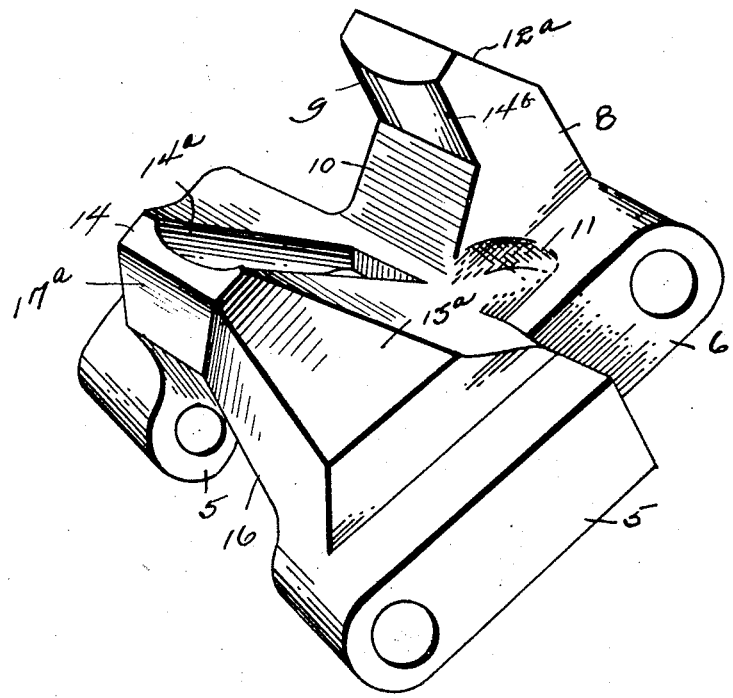
FIG-6-
Inventor
R. E. CHOATE.

Inventor
R. E. CHOATE,
By
Attorney

Patented June 14, 1932

1,862,784

UNITED STATES PATENT OFFICE

ROY E. CHOATE, OF CEDAR RAPIDS, IOWA

TRACKLAYING BELT

Application filed September 14, 1931. Serial No. 562,809.

My present invention has reference to improvements in track shoes and track laying belts of the type exemplified by the use of a plurality of similarly shaped shoe members, each having a male and a female portion, and articulated, with the male and female portions interengaged to sustain a load and form a perfect tread.

More particularly, my present invention is a continuation, in part, of my application for patent on track shoes, #369,886, filed June 10, 1929. My present invention is designed to provide a track laying belt structure composed of a plurality of similarly formed and shaped track shoes and wherein at least one-half of the shoes, in the lower portion of the belt, carry the weight on the upper circle of the track band; that is, my present track laying belt is so formed that as the track laying shoes travel about the rims of the wheels of the vehicle, they stack in a true circle so that the weight of each shoe is sustained by the next adjacent shoe to the end, that most of the load, represented by the weight of the track laying shoes, is sustained by the shoes and the belt itself, rather than being wholly carried by the wheels as has heretofore been the case in previous devices in the art with which I am acquainted.

In my present invention, when the vehicle is in progress, one shoe after another stacks around the rim of the wheel and results in a substantially perfect self-sustaining circle which relieves the rim of the wheel of almost all friction and weight. By reason of this peculiar function of my present invention, it has been found that the rims of track laying belt wheels, carrying my present type of shoe, show very little wear after almost two years of continuous use, while on the other hand rims which do not carry my present type of track shoe have been shown, by experimentation, to be substantially worn out in a period of from eight to ten months.

An additional object of my invention is to provide a track laying shoe so formed that the shoe will pass through mud, sand, dirt, and the like without clogging; this being due to the fact that certain of the surfaces of the shoes are formed to extend angularly with respect to the transverse axis of the shoe and with respect to each other thereby squeezing or extruding mud and dirt from between the operating parts. Especially is this true with vehicles working in either blow sand or wet sand or other materials which pack easily and which tend to so clog the shoes of other track laying belts with which I am familiar that they will not even rotate or turn. My present invention is also designed to provide a track laying shoe the construction of which, in addition to providing a self-cleansing action, will form a much more substantial track laying belt. There are many track shoes forming track laying belts shown in the art which are so formed that the units or shoes of the track laying belts resist relative deflection in one direction, so as to provide a rigid substantially horizontal track or unyielding traction surface when laid on the ground and subjected to a superimposed load. A practical workable belt, however, must necessarily have some form of self-cleansing arrangement in order to prevent breakage of the shoes and kindred parts when the shoes are traversing their curved path around the belt carrying wheels of the tractor. This is especially true with a device containing the improvements of my present invention and wherein the several shoes are adapted to stack in a substantially true circle as they pass around the peripheries of the wheels since otherwise the shoe will clog and bind and will not cooperate with each other in a practical stacking relationship.

My present invention upon the track shoes is therefore so formed that it is absolutely and positively self-cleansing to the end that it is impossible for any extraneous matter to clog the respective shoes so that they will not function with precision and as desired. In addition to so forming the shoes that they are self-cleansing to positively dislodge and to remove extraneous matter, the same peculiarly formed surfaces are designed to reinforce the shoes to provide a much more effective and rigid structure.

By reason of the fact that the shoes of my track laying belt automatically stack about the peripheries of the wheels, it follows as a corollary that much of the friction upon the track wheels is eliminated to the end that my track laying belt will not wear out the belt carrying wheels of a tractor and necessitate continuous repairs and replacements which are oftentimes required, and which necessitate expensive delays in work and the like.

In the foregoing I have endeavored to briefly outline some of the principal advantages of my invention, but since a thorough understanding and appreciation of all of its important features can only be properly understood when brought out in conjunction with a description of its particular mechanical features reference is had to the following specification wherein not only the structural elements of my invention are defined, but the advantages derivative therefrom are brought out; the scope of my present invention, however, is only to be determined from the claims appended hereunto, forming a part of this specification.

In the drawings wherein is illustrated the preferred form of my invention;—

Figure 3 is a side view of one of my shoes and shows the substantially prismatic formation of its surfaces and the formation of the bosses which squeeze out mud and the like.

Figure 4 is a top plan view of one of my shoes.

Figure 5 is a rear end view of one of my shoes and also shows the bosses.

Figure 6 is a perspective view of one of my track laying shoes.

Figure 7:
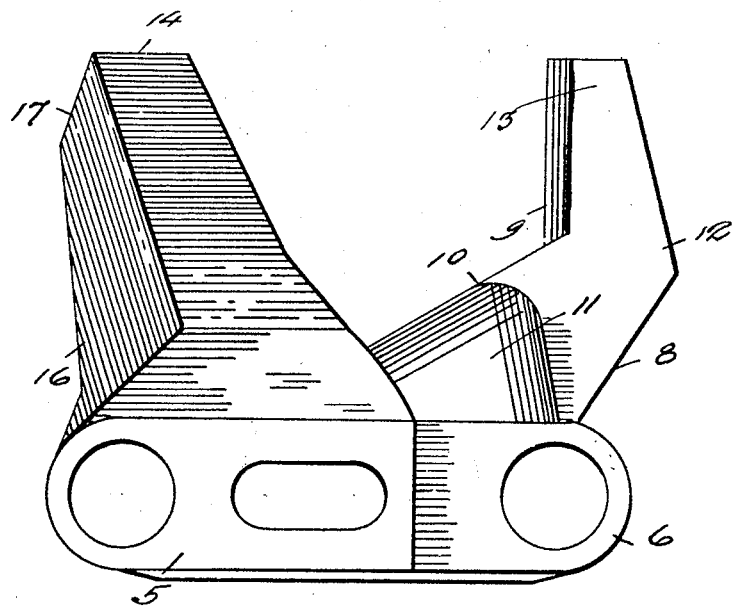
Figure 7 is a side elevation of one of my improved shoes as described in my application for patent, Serial Number 369,886.
Figure 8:
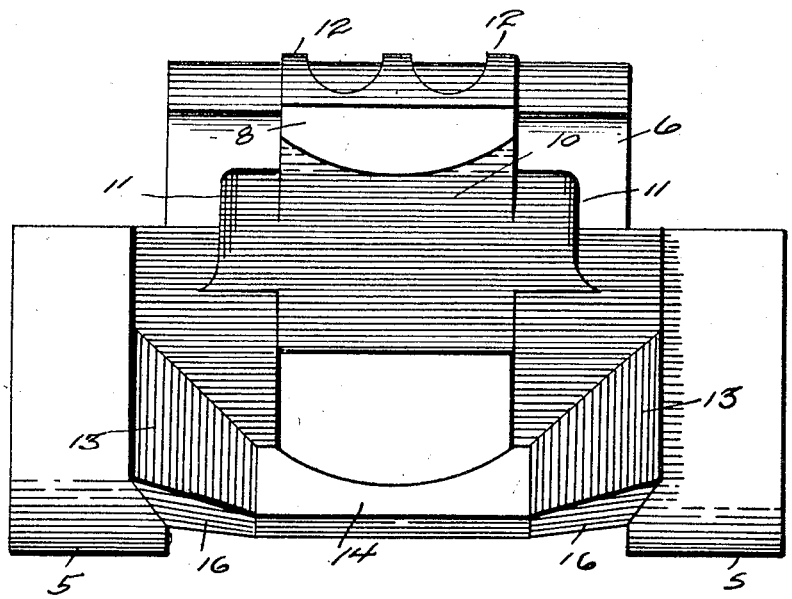
Figure 8 is a plan view of the shoe shown in Figure 7 as seen from above.
Figure 9:
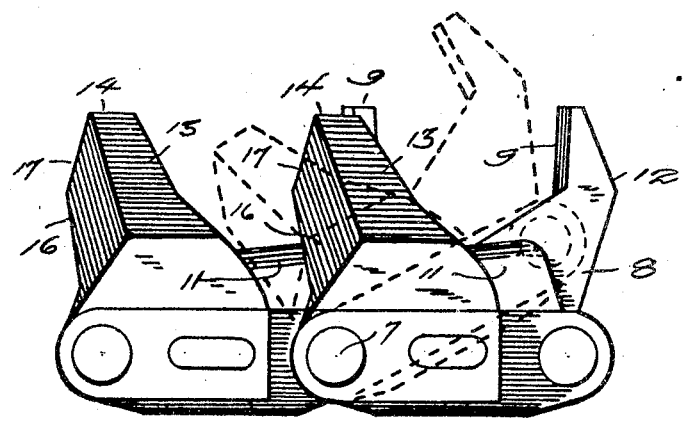
Figure 9 is a side elevation of a pair of the shoes shown and described in my application #369,886, linked together with the deflected position indicated in dotted outline.

Referring now to Figures 7 to 10, inclusive; the shoe herein shown is of the weight-carrying type not provided with outer traction ribs, but it will be evident that the improvements hereinafter described are equally applicable to traction shoes. The tread of the shoe, is in the nature of a link, having a pair of lugs (5) at one end and a single one (6) at the other end, the separate shoes being thus connectible by pins (7), of the type described in my co-pending application Ser. #540,450 as shown in Figure 9, to form a continuous belt. This may bend inwardly, as clearly shown in said Figure 9, but is prevented from bending outwardly by interlocking jaws extending inwardly from each shoe. One of these, (8), is a single solid jaw springing from the narrower end of the shoe, with nearly parallel sides. The locking part of the jaw (9) is disposed at practically a right angle to the tread, the jaw thence extending in an incline (10) to its terminus about the middle of the shoe, as shown in Figure 9. Flanking this inclined portion of the jaw is a pair of bosses (11), designed partly as strengtheners of the jaw, and partly as space-fillers, which latter fact will presently appear. The outer or rear portion of the jaw is formed as a series of ribs (12) with deep cavities therebetween, which construction gives adequate strength to the jaw, but also avoids a straight, flat surface such as would be more likely to catch and hold stones or accumulations of mud or dirt. This jaw may for distinction be designated as the male jaw.

The jaw at the opposite end of the shoe is formed as a bridge springing from the side lugs, including upwardly at (13ª) and having a cross-connection at (14) to act as an abutment for the male jaw of a connected shoe and thus hold the belt in a rigid, nearly straight position, as shown in Figure 9. These abutting surfaces, as best shown in Figure 9, are made convex (14ᵇ) on the male and concave as at (14ª) on the female jaw, so that mud disposed on either face will be pinched out sidewise more completely than would be the case if the two abutting surfaces were flat. It will be evident that any considerable accumulation of mud between the jaws at these points would prevent the proper straightening of the belt between carrying wheels, strain it unduly, and cause it to run hard, and possibly lead to slippage of the wheels within the belt.

In this connection it may be stated that the treads of the carrying wheels (not shown) are supposed to run on the portions of the shoes outside the jaws.

Figure 10:
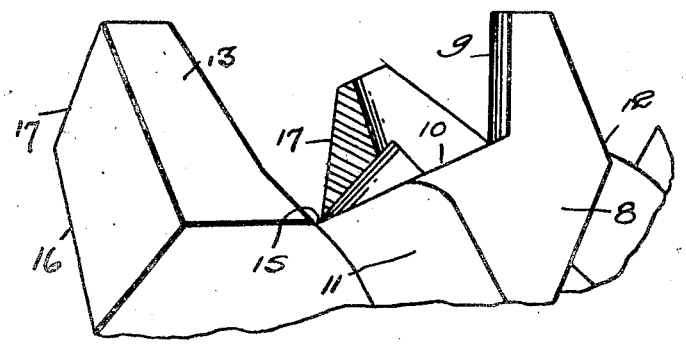
Figure 10 is a fragmentary view with one jaw in section centrally.

The open space under the bridge of the female jaw is made to conform quite closely to a cross-sectional outline of the male jaw and its bosses, as shown in Figures 7, 8 and 9. Accumulations of mud on the male jaw will thus be scraped off as the shoes are deflected in moving over the rims of the carrying wheels. Referring more particularly to Figure 10, it will be seen that the angle of the female jaw at (15) is so close to the adjacent part of the male jaw at the terminal position that little or no mud or dirt could accumulate to clog the movement of the belt.

By reference to Figures 9 and 10, it will be seen that in the deflected position the female jaws approach each other quite closely. If the opposing faces of the jaws are substantially parallel any interposed mud or other obstruction, while the jaws are in this position, will be pressed flat, and, accumulating, will produce a very severe and detrimental strain on the belt. This is prevented by angling rather sharply the advancing face of the jaw at (16), so that interposed mud is thrust sidewise, as earth is carried laterally by a plough-share. Similarly and for the same reason the bridge is angled at (17), though the tendency of obstructing material to pack at this point is less than at the sides.

The improvements above described serve in a very practical way to minimize, or wholly eliminate, what has been a source of much labor, trouble and annoyance in the operation of self-laying track belts, especially in soft or muddy ground.

It is to be understood that the units of the belt are much hollowed out by coring, to give all the lightness possible, consistent with sufficient strength, but this part of the construction is not herein illustrated, as it forms no essential part of the invention.

Figure 1:
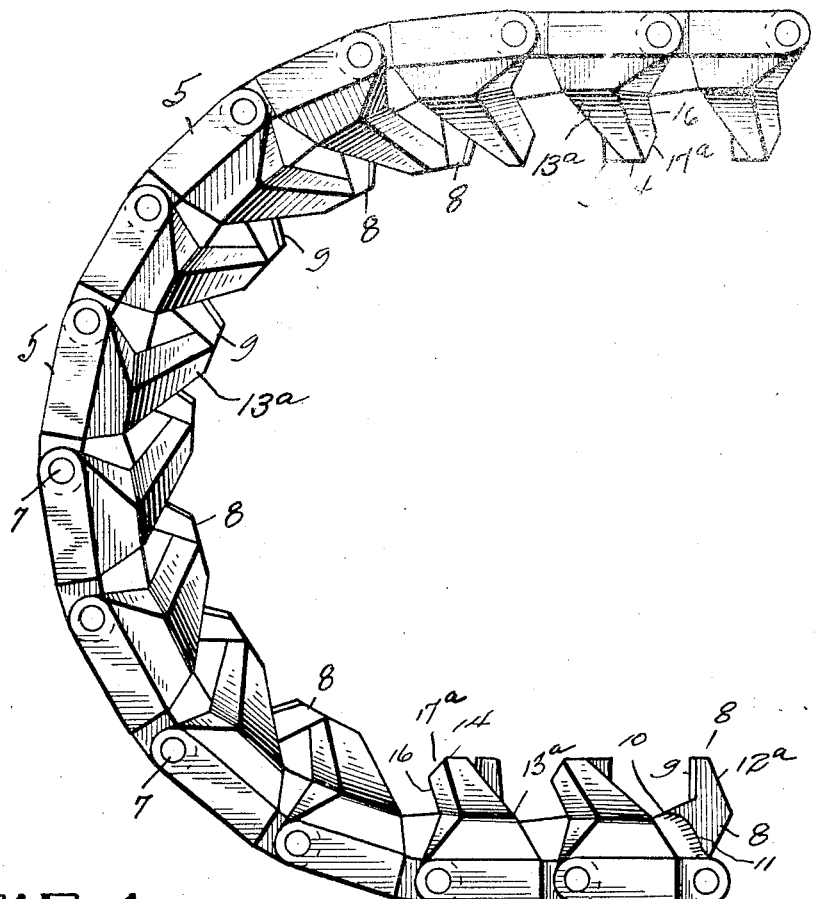
Figure 1 is a diagrammatic view of my improved shoes and track laying belt and shows the manner in which said shoes stack to take up weight and eliminate friction upon the track laying wheels of the tractor.
Figures 2, 2A:
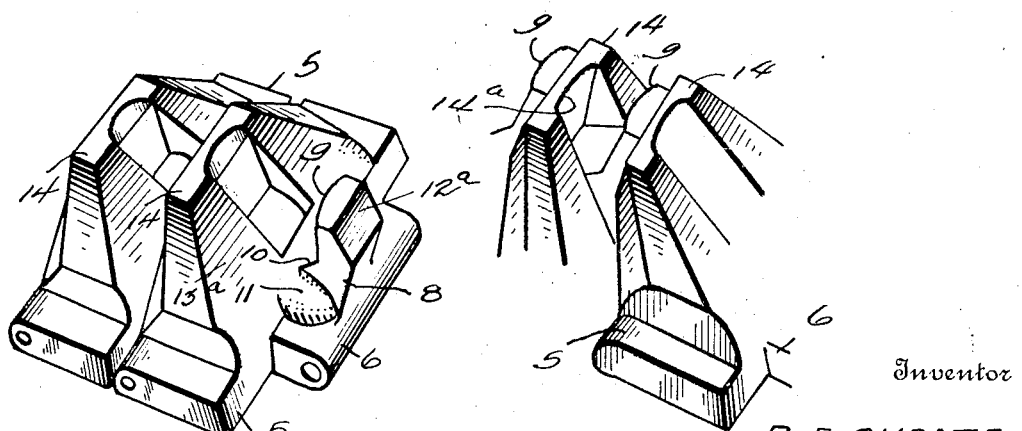
Figure 2 is a perspective diagrammatic view showing the manner in which the male and female portions of adjacent shoes interengage to form a load supporting substantially horizontal tread.
Figure 2A is a diagrammatic perspective view showing the manner in which the male and female portions of adjacent tract laying shoes interengage to stack in substantially a true circle about the periphery of a track laying wheel of a tractor.

Referring now to Figures 1 to 6, inclusive, it will be seen that the male element (8) has a flat face (12$^a$) opposite the convex face (14$^b$) and a flat face (17$^a$) at the bridging part (14). In practice when the shoes interengage, after the manner shown in Figure 2, to form a rigidly substantially horizontal tread, the convex face (14$^b$) of the male part (8) seats in the concave face 14$^a$ of the female part. On the other hand, when the shoes are deflected toward each other, as shown in Figure 2—A and in Figure 1, the flat face (12$^a$) of the male part (8) engages the flat face (17$^a$) of the female part of the next adjacent shoe so that shoes assume a stacking relationship, as shown in Figure 1. As shown in Figure 1, when the shoes are deflected with respect to each other to pass about the wheel and having a substantially circular curvature, the flat face (12$^a$) of the male part of each shoe engages the flat face (17$^a$) of the female part of each shoe so that each shoe making up the track laying belt is supported and sustained by the next adjacent shoe to sustain the weight of the entire belt so that the track laying wheel of the tractor (not shown) is largely freed from its load and friction upon the periphery of the wheel eliminated, thereby greatly increasing the life of the wheel, reducing repairs, greatly increasing the efficiency of the operation of the track laying belt and providing a greatly improved track laying structure. It will be seen that the ribs (12), shown in Figure 8, are eliminated in the form of my invention shown in Figures 1 to 6 and that the structure of the shoe, in Figures 1 to 6, is slightly modified from the structure of the shoe shown in Figures 7 to 10. However, there is provided, in the type of shoe shown from Figures 1 to 6, certain cavities (17) to reduce the weight of the shoe.

While it is believed that the construction, advantages, and operation of my track laying shoe and the track laying belt formed by a plurality of articulated shoes is apparent, from the foregoing, it is emphasized that each of my track laying shoes have five major functions. In the first place, the male member of each shoe and the female member of each shoe each have a flat face. These flat faces are designated (12$^a$ and 17$^a$). The flat face of the male member or element (8) contacts with the flat face (17$^a$) of the bridging part (14) of the female member, when the track shoes are deflected toward each other to approach the conformation of a circle, as is the case when the shoes are passing about the periphery of a track laying wheel of a tractor. Accordingly the shoes, as they pass about the track laying wheel of the tractor, are stacked up and supported each upon the others to largely relieve the track laying wheel of the tractor of the load of the track laying belt and of friction. Second, each track laying shoe has a convex face (14$^b$) on the male element (8) and a concave face (14$^a$) on the female part. The convex face contacts with and seats in the concave face when the shoes are disposed substantially in line with each other to form the tread of the track laying belt so that the tread is rigid to sustain the weight of the tractor. Third, by reason of the peculiar formation of the faces (14$^a$ and 14$^b$) accumulated mud and dirt is squeezed out and cannot pack between the faces to prevent proper articulation of the shoes with respect to each other, and proper horizontal aligning of the shoes to form the track laying belt. This is an especially important purpose of my invention. Fourth, the angular surfaces of the female element function after the manner of a plow share, that is, the surfaces (16) for instance, incline outwardly and backwardly or at an angle to the transverse axes of the shoes to cooperate with the complementary rear surfaces of the female part of the next adjacent shoe to squeeze and throw accumulated dirt and sand outwardly from each side of the shoe when the respective shoes are hinged or moved toward each other. That is, such space as is left between the respective female parts of the shoes, when the shoes are moved toward each other, is wedge-shaped and this is due to the angular formation of the surfaces. Fifth, on each side of the male member of each shoe is formed a boss (11). The bosses serve a double purpose. Each boss seats in a similarly formed cavity in the bridge part of the female member to squeeze and scrape any accumulated mud and sand out from the hinging part of the shoes, thereby preventing possible clogging of the shoes. In other shoes, with which I am acquainted, there is a tendency of mud and dirt to accumulate in such a manner that the hinging action between the shoes is liable to become clogged. The bosses, on the other hand, prevent the accumulation of mud and sand at the hinging point and between the male and female parts of the shoes so that the shoes work free irrespective of the type of ground surface over which the tractor is working. On the other hand, the bosses are so formed and arranged that they reinforce and sustain the male member of the shoes at their bases where the greatest strain exists, thereby preventing any possibility of cracking of the male members under the weight of a load.

From the foregoing, it will be seen that I have provided a greatly improved track laying structure and in this connection attention is called to the fact that the present application is a continuation, in part, of my application for patent, Ser. No. 369,886. It is again emphasized that the scope of the present invention is to be ascertained only from the claims appended hereunto and forming a part of this specification.

I claim:

1. An endless track belt comprising a plurality of track shoes having their tread portions pivotally interlinked, each shoe being provided with upstanding male and female jaws, the male jaw of each shoe abutting the female jaw of an adjacent shoe to lock the endless track belt against inward deflection beyond a straight line, the side of each male jaw opposite its abutting side being formed as angled ribs in profile, with deep cavities between the ribs.

2. In a track laying belt of the type formed with a plurality of similar pivotally connected track shoes each having an upstanding male and female member for interengagement with corresponding cooperating members on the next adjacent articulated shoes to form a belt; the female member of each shoe formed with a plurality of surfaces disposed angularly with respect to each other and with respect to the transverse axis of the shoe and converging outwardly, one of said surfaces forming an edge to provide a peeling action to remove extraneous matter adhering to the interengaged male member of an adjacent shoe, and both of said surfaces cooperating with opposed angularly disposed surfaces of the female members of the next adjacent articulated shoes to form substantially wedge-shaped spaces between the female members of the respective shoes and adapted to extrude and squeeze out dirt, stones, sand and other extraneous clogging material between the shoes when the shoes are deflected toward each other.

3. In a track laying belt of the type formed with a plurality of similar pivotally connected track shoes each having an upstanding male and female member for interengagement with corresponding cooperating members on the next adjacent articulated shoes to form a belt; the female member of each shoe formed with a plurality of surfaces disposed angularly with respect to each other and with respect to the transverse axis of the shoe and converging outwardly, and both of said surfaces cooperating with opposed angularly disposed surfaces of the female members of the next adjacent articulated shoes to form substantially wedge-shaped spaces between the female members of the respective shoes and adapted to extrude and squeeze out dirt, stones, sand and other extraneous clogging material between the shoes when the shoes are deflected toward each other.

4. In a track laying belt of the type formed with a plurality of similar pivotally connected track shoes each having a male and a female member for relative interengagement with corresponding cooperating members on next adjacent articulated shoes to form a belt; the female member of each shoe having surfaces at each side of the central longitudinal axis of the belt disposed angularly with respect to the transverse axis of the shoe and converging outwardly, the respective angularly disposed surfaces of the female members of the several track shoes being opposed to each other to provide substantially wedge shaped spaces on each side of the longitudinal axis of the belt thereby to extrude or squeeze out extraneous matter from between the shoes when flexure of the belt is towards a circle, and the male members having bosses with curved surfaces on each side of the bases thereof and extending part way up the sides of the members, and the female jaws having internal surfaces closely conforming in shape to the shape of the bosses and adapted to receive the bosses therein when the shoes are linked together to peel any clogging matter on said bosses into said wedge shaped spaces.

In testimony whereof, I hereunto affix my signature this 12th day of August, 1931.

ROY E. CHOATE.